United States Patent

Sitachitt et al.

[11] Patent Number: 5,693,881
[45] Date of Patent: Dec. 2, 1997

[54] SENSOR-BASED LIQUID LEVELING SYSTEM FOR STRUCTURES

[76] Inventors: Sidney Sitachitt, 9024 Bogata Cir.;
John A. Horvath, 7205 Rock Canyon Dr., both of San Diego, Calif. 92126;
William A. Roden, 4851 Kenmore Ter., San Diego, Calif. 92116

[21] Appl. No.: 356,633

[22] Filed: Dec. 15, 1994

[51] Int. Cl.⁶ ............................................. G02F 23/00
[52] U.S. Cl. ................................................. 73/290 V
[58] Field of Search .......................... 73/290 V, 1 H, 73/293, 1.31, 1.73

[56] References Cited

U.S. PATENT DOCUMENTS

| | | | |
|---|---|---|---|
| 4,338,809 | 7/1982 | Englund | 73/1 H |
| 4,763,518 | 8/1988 | Daviaund et al. | 73/1 H X |
| 4,868,797 | 9/1989 | Soltz | 73/290 V X |
| 5,036,703 | 8/1991 | Eriksson | 73/290 V |
| 5,121,340 | 6/1992 | Campbell et al. | 73/290 V X |
| 5,245,869 | 9/1993 | Clarke et al. | 73/1 H X |
| 5,274,245 | 12/1993 | Lee | 73/293 X |
| 5,309,763 | 5/1994 | Sinclair | 73/290 V |

*Primary Examiner*—Elizabeth L. Dougherty
*Attorney, Agent, or Firm*—John R. Duncan; Frank D. Gilliam

[57] ABSTRACT

A level measuring system for leveling structures using the principal that water seeks its own level. A plurality of sensor vessels each of which includes ultrasonic transducers for measuring the level of a liquid in the vessel. A liquid source provides liquid to the sensors and a vacuum pump withdraws the liquid after measurements are complete. Each sensor vessel includes two ultrasonic transducers, one of which measures the sonic velocity and the other measures the level of the liquid. A calibration device is provided to verify calibration of the level measuring sensor. In one embodiment, the two ultrasonic sensors are arranged vertically in a transparent cylindrical housing. In a second embodiment, a first horizontal bore and a second intersecting vertical bore are provided in a solid material, with the sonic velocity measuring sensor at one end of the horizontal bore and the level measuring sensor in the vertical bore.

9 Claims, 2 Drawing Sheets

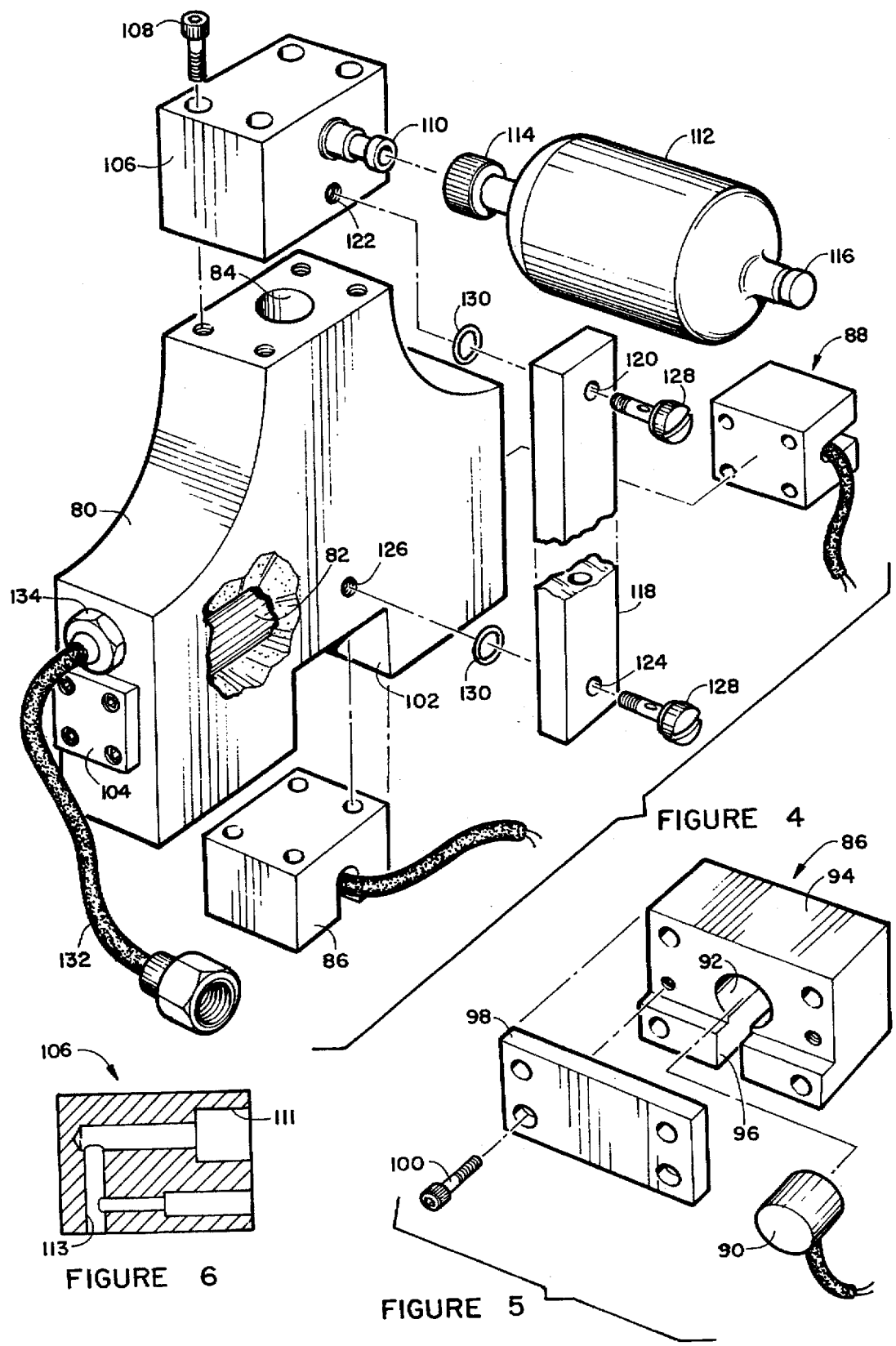

5,693,881

SENSOR-BASED LIQUID LEVELING SYSTEM FOR STRUCTURES

BACKGROUND OF THE INVENTION

This invention relates in general to measuring the level condition of large structures and, more specifically, to a highly accurate sensor-based system for determining the level condition of a structure relative to a body of water within the structure.

A variety of leveling tools have been developed for measuring the level of a surface and adjusting the surface. Typically of these is the conventional carpenter's level, using bubble levels to determine when a surface is level. While very effective with small structures, such levels become ineffective with large structures because inherent limitations of carpenter's level sizes and the loss of accuracy due to bending, etc. with very long levels.

The relative level condition of surfaces and structures can be determined with surveying instruments, theodolites and the like. These methods require expensive equipment, a number of operators and considerable time. Since clear lines-of-sight are required for optical systems, they are not effective in a cluttered production setting. While effective with one-of-a-kind projects, such as large buildings, they are not cost effective in a production environment.

A number of leveling methods use the principal that "water seeks its own level". In the simplest embodiment, homeowners may level a yard and establish drainage patterns using a conventional garden hose with transparent tubes at the ends. The water levels in the tubes will establish level points across a yard. These crude devices do not provide the accuracy and convenience of use required under factory production conditions.

More elaborate water level devices have been developed. For example, Cluley in U.S. Pat. No. 3,949,484 describes a system for detecting and recording vertical displacement of parts of a large structure. Cluley uses multiple water vessels with a float and plunger arrangement on mechanical bearings to drive a DC/DC transformer to vary the output of an electrical circuit, with the difference in output from each vessel indicating level between units. Accuracy of this system is limited by mechanical friction and hysteresis inherent in the use of mechanical moving floats and float dimensional tolerances. In addition, system accuracy is affected by vibration and fluid temperature fluctuations.

Legris in U.S. Pat. No. 4,379,367 and Melugin in U.S. Pat. No. 4,384,410 describe systems including a float device to measure the height difference in only two locations, using mercury as the fluid and variable resistors to measure level differences. Mercury is a dangerous and increasingly prohibited substance. Accuracy is limited by mechanical friction and the tendency of mercury to stick to surfaces due to surface tension.

A leveling apparatus described by Ostby in U.S. Pat. No. 4,603,485, requires the use of mercury as the leveling fluid since the system depends on the generation of magnetic fields caused by eddy currents in the electrically conductive mercury that are induced by induction coils positioned above the liquid surface. While this avoids mechanical friction problems, the use of mercury is prohibited in many environments and the accuracy of the magnetic field sensors are subject to the accuracy of the strength and stability of the primary field. Again, only two position measurement is possible.

Thus there is a continuing need for improved level measurement systems, using benign liquids such as water, allowing measurement at more than two locations, and avoiding mechanical friction and hysteresis problems to provide increased reliability and accuracy.

SUMMARY OF THE INVENTION

The above noted problems, and others, are overcome by the sensor-based liquid leveling system of this invention, which basically comprises a plurality of ultrasonic sensor vessels, a liquid reservoir/vacuum accumulator for delivering water (or other suitable liquid) to the sensor vessels prior to leveling and withdrawing liquid from the vessels upon completion of leveling and a controller system including a multiplexer and display for receiving level signals from the sensors at the vessels and providing relative level information.

Liquid levels in all but one sensor vessel may be compared to the level in one preselected "master" vessel. Or, levels may be compared to a predetermined level above a selected plane, e.g. the surface of the structure being leveled. Since the speed of ultrasonic waves in liquids varies with temperature, it is necessary to determine the speed of sound under ambient conditions to obtain a correct level. A conventional computer controller can make the necessary corrections once the variations are measured.

In addition to measuring the relative level of a structure at different points, this system may be used to measure vertical offset of a surface from the basic structure within the range of the instruments. If greater offset is to be measured, gauge blocks may be placed under a sensor vessel to lift it to a position where the vertical offset is within the sensor range.

Each sensor vessel basically comprises a container for holding a quantity of water or other suitable liquid, two ultrasonic transducers one of which measures sound velocity to calibrate the unit and the other of which measures liquid level. An arrangement for calibrating the liquid level sensor is also provided. A liquid inlet/outlet is provided in the sensor vessel.

BRIEF DESCRIPTION OF THE DRAWING

Details of the invention, and of preferred embodiments thereof, will be further understood upon reference to the drawing, wherein:

FIG. 4 is a schematic perspective view of a second embodiment of a sensor vessel;

FIG. 5 is a schematic perspective view of an ultrasonic sensor assembly useful with the sensor vessel of FIG. 4; and FIG. 6 is a section view through the vent block taken on line 6—6 in FIG. 4

DETAILED DESCRIPTION OF PREFERRED EMBODIMENTS

Figure 1:
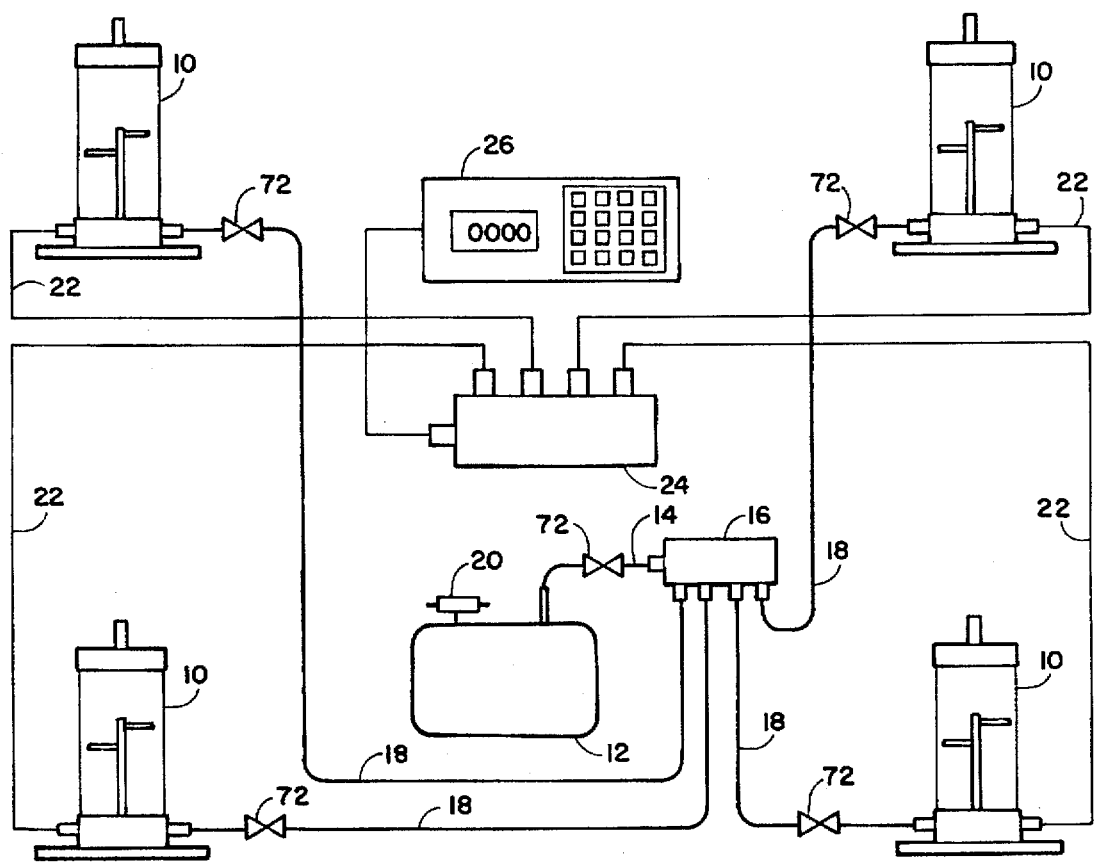
FIG. 1 is a schematic diagram of the overall sensor-based liquid leveling system.

As seen in FIG. 1, the leveling system includes a plurality of sensor vessels 10 to be placed at suitable, approximately level, locations on a structure. While FIG. 1 shows a four vessel arrangement, any suitable number of vessels may be used to measure level at a variety of numbers of points. Where a very large number of points are to be measured, the data acquisition capabilities of the controller or data logger will be increased accordingly. A combination water reservoir and vacuum accumulator 12 contains water to be directed to vessels 10 for leveling.

Water is passed to vessels 10 through tube 14, manifold 16 and tubes 18, by evacuation, pressure pumping or gravity feed, as desired. All of tubes 18 are connected through manifold 16 so that water can freely move between vessels by gravity, so that the static water level is uniform. When the leveling measurements are complete, a vacuum pump 20 is operated to draw a vacuum on accumulator 12, drawing water back from all of the vessels 10. Since the vessels and tubing system are then essentially dry, the system may be disassembled and moved without spilling water.

Ultrasonic transducers in each vessel 10 measure the water level in the vessel and transmit a corresponding signal through a wire 22 to a multiplexer 24, typically a Model AU3 from Canongate, and from there to a controller/display unit 26, typically a Model V3-200 from Canongate. Values are displayed at controller 26 that represent the actual liquid level in each vessel or the variances of each of three vessels with respect to a predetermined (fourth) master vessel.

Figure 2:
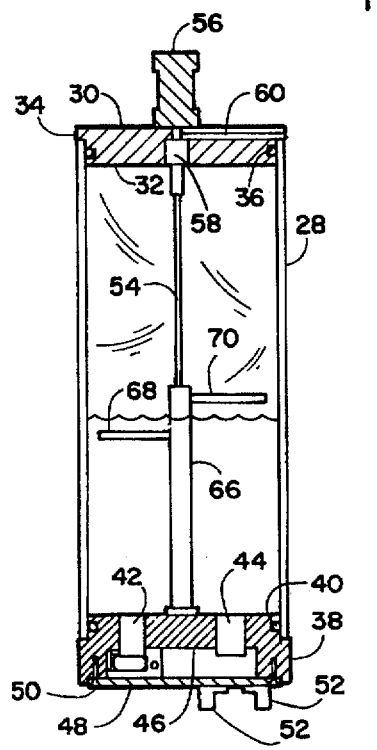
FIG. 2 is a schematic perspective view of a first embodiment of a sensor vessel.
Figure 3:
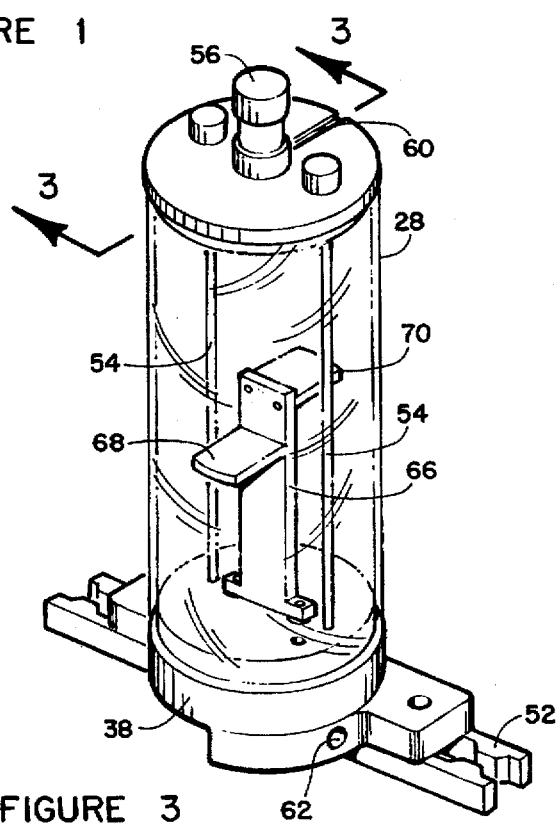
FIG. 3 is a section view taken on line 3—3 in FIG. 2.

Details of a first embodiment of sensor vessels 10 are provided in FIGS. 2 and 3. Each vessel 10 basically includes a tubular wall 28 which is preferably transparent. While wall 28 may be made from any suitable material, such as tempered glass, transparent plastic, etc., an acrylic resin is preferred for optimum transparency, toughness and the necessary strength.

The top of vessel 10 is closed by a top cover 30 which includes a plug portion 32 fitting within the top of cylinder 28 and a flange portion 34 extending over the edge of the cylinder end. The two portions making up top cover 30 can be machined as a single piece or may be made from two pieces, secured together by screws, adhesives or the like. An O-ring is placed in a circumferential groove around plug portion 32 to seal against the inner wall of cylinder 28.

Base 38 closes the lower end of cylinder 28. The upper end of base 38 extends into cylinder 28 and includes an O-ring 40 in a circumferential groove to seal against the cylinder inner surface. Two openings are provided in the recessed lower surface 46 of base 38 to receive ultrasonic sensors 42 and 44. Wires 22 (as seen in FIG. 1) extend from sensors 42 and 44 out though holes (not shown) in the side of base 38. A bottom access cover 48 covers the base and is removably held thereto by bolts 50 threaded into the base.

While the sensor vessels 10 could be simply placed on a surface to be leveled, with base 38 in contact with the surface, in some cases, attachment means may be preferred for securing the vessels to the surface. In the embodiment shown, flanges incorporated into the geometry of base 38 are used to mount and fasten the vessel to the structure to be leveled, such as aircraft seat tracks 52, which are a part of the floor of a large aircraft fuselage floor where that floor is to be leveled. Any other attachment means may be designed into base 38 or fastened to base 38 for attachment to other structures which are to be leveled.

As seen in FIG. 2, cover 30 and base 38 are held to cylinder 28 by a pair of long threaded rods 54 extending through cover 30 to threaded holes in base 38. Any other suitable means for securing cover 30 and base 38 to cylinder 28 may be used, such as external rods or cables. A vent valve 56 is included on cover 30, to open and close communication between the interior of vessel 10 and the atmosphere when water is being admitted to or withdrawn from the vessel. The valve is typically a Model SLV-2-2 from Clayton Controls. The valve opens and closes communication between a hole 58 through cover 30 and a groove 60 in the outer surface of cover 30. Water enters and leaves vessel 10 through a fitting 62 in the side of base 30 (FIG. 2) which communicates with a hole 64 in the inner surface of the base.

A gauge support 66 is mounted at approximately the center of base 30 by bolts or the like. A sonic velocity reference gauge 68 is mounted on support 66 at a precise selected distance above sensor 42. Typically, that distance might be 100 mm. A range reference gauge 70 is mounted on support 66 a precise selected distance from sensor 44, greater than the distance between sensor 42 and sonic velocity reference gauge 68, typically 120 mm.

To operate the liquid leveling system, vessels 10 are placed on the structure surface to be leveled. The vessels 10 are connected to the multiplexer 24 and plumbed to manifold 16. Manifold 16 is connected to the water line that exists reservoir 12. Multiplexer 24 is connected to controller/display unit 26 and the controller is plugged into a suitable power source.

Air vent valves 56 on each vessel 10 are closed and the shutoff squeeze clamps 72 on tubes 14 and 18 are opened. Vacuum pump 20 is turned on and a vacuum is drawn on the entire system, typically to 20 to 25 mm Hg. Once the vacuum is established, pump 20 is turned off which immediately vents accumulator/reservoir 12 to the atmosphere. This causes a differential pressure across the water volume in reservoir 12 which pushes the water through tubes 14 and 18 and into vessels 10 until the remaining air in vessels 10 is compressed to ambient air pressure, at which point fluid pumping automatically ceases. Vessels 10 are designed so that the final liquid level is above both reference gauges 68 and 70.

The display on controller/display unit 26 is then read to ensure that each vessel 10 is registering the exact distance of range reference gauge 70 via sensor 44. This verifies system calibration. If not precisely calibrated, range adjustments are made. Once calibration is verified, vent valves 56 are opened on each vessel 10 and the water level is allowed to drop into the working range of the vessel, below gauge 70 and above gauge 68.

The clamps 72 are then closed and the vessels are mounted on the surface of the structure to be leveled. In the case of the floor of a large aircraft fuselage, the base flanges are secured to the floor seat tracks at the locations selected for leveling. The clamp 72 on tube 14 at manifold 16 is then closed and the four clamps 72 on tubes 18 are opened, creating a common body of water that will to come to equilibrium at level.

Once the water body has come to a static state, the display is read to determine the individual vessel water heights and the relative difference among them is calculated to establish the altitude difference relative to a selected attitude. Conventional software algorithms may be embedded in controller 26 to perform these calculations or they may be done independently. The result is values that represent variances of each of three vessels with respect to the predetermined fourth master vessel.

After the relative variances are established, the operator mechanically adjusts the supports of the structure to bring the structure within the manufacturing specification, typically about 0.010 inch for aircraft floor structures. If desired, the displayed variance values could be sent to a computer-controlled, motorized, jacking system that would automatically perform the structural adjustments required.

After leveling is complete, the clamps 72 are all opened and vacuum pump 20 is started, which draws all of the water out of vessels 10 and back into reservoir/accumulator 12 for storage. The apparatus can then be moved to the next leveling site.

FIGS. 4 and 5 show a second embodiment of the sensor vessels, useful in place of vessels 10 in the system shown in FIG. 1.

Sensor vessel 80 in this embodiment is basically a solid body, typically formed from aluminum or another material by numerical controlled machining. A horizontal bore 82 extends entirely through vessel 80. A vertical bore 84 extends from the top of vessel 80, intersecting with horizontal bore 82 and extending through the bottom of vessel 80. These bores provide the volume for the leveling water.

Two sensor assemblies 86 and 88, detailed in FIG. 5, are identical. As seen in FIG. 5, an ultrasonic sensor 90 is fitted in a cavity 92 in body 94, typically a block of aluminum. A groove 96 is provided to allow wire 18 (as seen in FIG. 1) to exit body 94. A strap 98 is fastened to body 94 by screws 100 to hold sensor 90 in place.

Returning to FIG. 4, the range measurement sensor assembly 86 fits in a cavity 102 with sensor 90 aligned with the end of vertical bore 84 and is held in place by bolts or the like. The sonic velocity measurement sensor assembly 88 is fastened, such as by bolts, to the side of vessel 80 with its sensor 90 aligned with one end of horizontal bore 82. A flat plate 104 closes the second end of horizontal bore 82 and provides a smooth surface for the sonic velocity sensor assembly 88 to bounce ultrasonic waves against.

The upper end of vertical bore 84 is closed with a vent block 106, typically machined from aluminum, secured to vessel 80 by screws 108. Block 106 provides a smooth surface for ultrasonic waves to bounce against during system calibration. A vent/fill connector 110 connects to a hole 113 through block 106 and through to vertical bore 84 in vessel body 80. A vacuum accumulator 112 has an automatic shut-off connector 114 which can be connected to connector 110 and disconnected without releasing excess water collected by the accumulator during the filling process. A sleeve valve 116 is connected to the second end of accumulator 112. When sleeve valve 116 is closed, the system is air and vacuum tight. If desired, a line to a central vacuum accumulator could be used in place of accumulator 112. Using removable accumulator 112 avoids the necessity of running long vacuum tubes with the possibility of leaks while permitting the sensor vessel to be placed in a small volume for use.

A sight glass 118, typically a transparent plastic or glass block with a hole (not seen) extending most of the length thereof is provided to allow the water level in vertical bore 84 to be observed. An upper transverse hole 120 in sight glass 118 intersects the lengthwise hole and corresponds to a hole 122 through block 106. A lower transverse hole 124 in sight glass 118 intersects the lengthwise sight glass hole and corresponds to a hole 126 through vessel 80 intersecting horizontal bore 82. Two hollow screws 128 secure sight glass 118 in place, with two O-rings 130 between the sight glass and vessel to prevent leaks.

Water is provided to the vertical and horizontal bore system through a water tube 132 and a connector 134 which connects to a hole (not seen) in vessel 80 which intersects horizontal bore 82.

Sensor vessel operates in a basically similar manner to sensor vessels 10 as seen in FIGS. 1–3. The system of FIGS. 4–6, however has advantages in that the range of vertical measurement along vertical bore 84 is much greater than the range between gauges 68 and 70 as seen in FIGS. 2 and 3.

Details of the internal structure of vent block 106 are provided in the section view of FIG. 6. Vent/fill connector 110 is connected to opening 111 which communicates with hole 113, as does hole 122 which communicates with sight glass 118 as described above. Hole 113 communicates with vertical bore 84.

The filling and draining procedures for this embodiment are the same as for the first embodiment. Removable vacuum accumulators 112 serve the same function as the excess volumes at the upper end of each cylinder 28. In the second embodiment, however, the accumulators are disconnected from vessels 80 after the fill operation. This allows vessels 80 to be placed in more confined spaces than vessels 28 due to their much smaller size. Any excess liquid that flows into accumulators 112 during filling is removed during draining by reconnecting accumulators 112 to vessels 80, with venting through valve 116 while vacuum pump 20 draws down the system.

The embodiment of FIGS. 4 and 5 is smaller, more compact and more rugged, being all metal, than that shown in FIGS. 1–3. Also, calibration accuracy can be better since it is governed by achievable machining tolerances rather than the assembly tolerances of the first embodiment. With the second embodiment, reading accuracy is insensitive to transverse tilting of vessel 80 within the limits of transducer response range, so this vessel configuration can be used on structures that are not themselves assembled true to the intended leveling plane.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

We claim:

1. A liquid level sensor based structure level measuring system which comprises:

a plurality of sensor vessels;

means for introducing a liquid into each vessel;

first ultrasonic transducer means for measuring sonic velocity in each vessel;

second ultrasonic transducer means for measuring liquid depth in each sensor vessel;

tube means interconnecting said vessels so that said liquid can reach a common level in all vessels;

means for comparing relative liquid depth in each vessel;

means for displaying differences in liquid depth in a selected one of said vessels to liquid depth in each other vessel; and means for withdrawing said liquid from said vessels and said tube means.

2. The leveling system according to claim 1 further including means in each vessel for calibrating said liquid depth measuring transducer.

3. The leveling system according to claim 1 wherein said means for withdrawing liquid from vessels and tubing comprises a vacuum accumulator connected to said vessels and means for providing a vacuum at said accumulator.

4. The leveling system according to claim 1 wherein said sensor vessel includes a transparent cylindrical outer wall closed by a top cover and a base with said first and second ultrasonic transducers mounted in said base for emitting ultrasonic energy in a vertical direction.

5. The leveling system according to claim 4 wherein means for measuring sonic velocity includes a first reflector positioned a predetermined distance from said first transducer and further including a second reflector spaced a predetermined distance from said second ultrasonic transducer for verifying calibration of said second ultrasonic transducer.

6. The leveling system according to claim 1 wherein said vessel comprises:

a block of solid material having a top, a bottom, a first, horizontal, bore therethrough and a second, vertical, bore from an upper end at said top of said block through an intersection with said first bore to a lower end said bottom of said block;

said first bore being closed at a first end by said first ultrasonic transducer and at a second end by a reflector surface; and said second ultrasonic transducer positioned at said lower end of said second bore.

7. An ultrasonic sensor apparatus for use in measuring level of structure surfaces which comprises:

a vessel having an internal chamber for receiving and containing a liquid;

said vessel comprising a block of solid material having a top and bottom and having a first, horizontal, bore therethrough and a second, vertical, bore having an upper end and a lower end and extending from said top of said block through an intersection with said first bore to said bottom of said block;

a first ultrasonic transducer spaced a predetermined distance from a first reflecting surface to measure sonic velocity of a liquid filling space between said first ultrasonic transducer and said first reflecting surface;

said first bore being closed at a first end by said first ultrasonic transducer and at a second end by a reflector surface;

a second ultrasonic transducer oriented to generate an ultrasonic signal upward toward a surface of a liquid covering said second ultrasonic transducer to measure distance between said second ultrasonic transducer and said liquid surface;

said second ultrasonic transducer positioned at said lower end of said second bore;

a vent through a wall of said chamber for selectively venting said internal chamber to the atmosphere; and means for admitting and discharging liquid from said vessel.

8. The ultrasonic sensor apparatus according to claim 7 further including a reflecting surface spaced a predetermined distance from said second ultrasonic transducer for verifying calibration of said second ultrasonic transducer.

9. The ultrasonic sensor apparatus according to claim 7 further including means for mounting said vessel on a structure surface.

* * * * *